Figure 1:
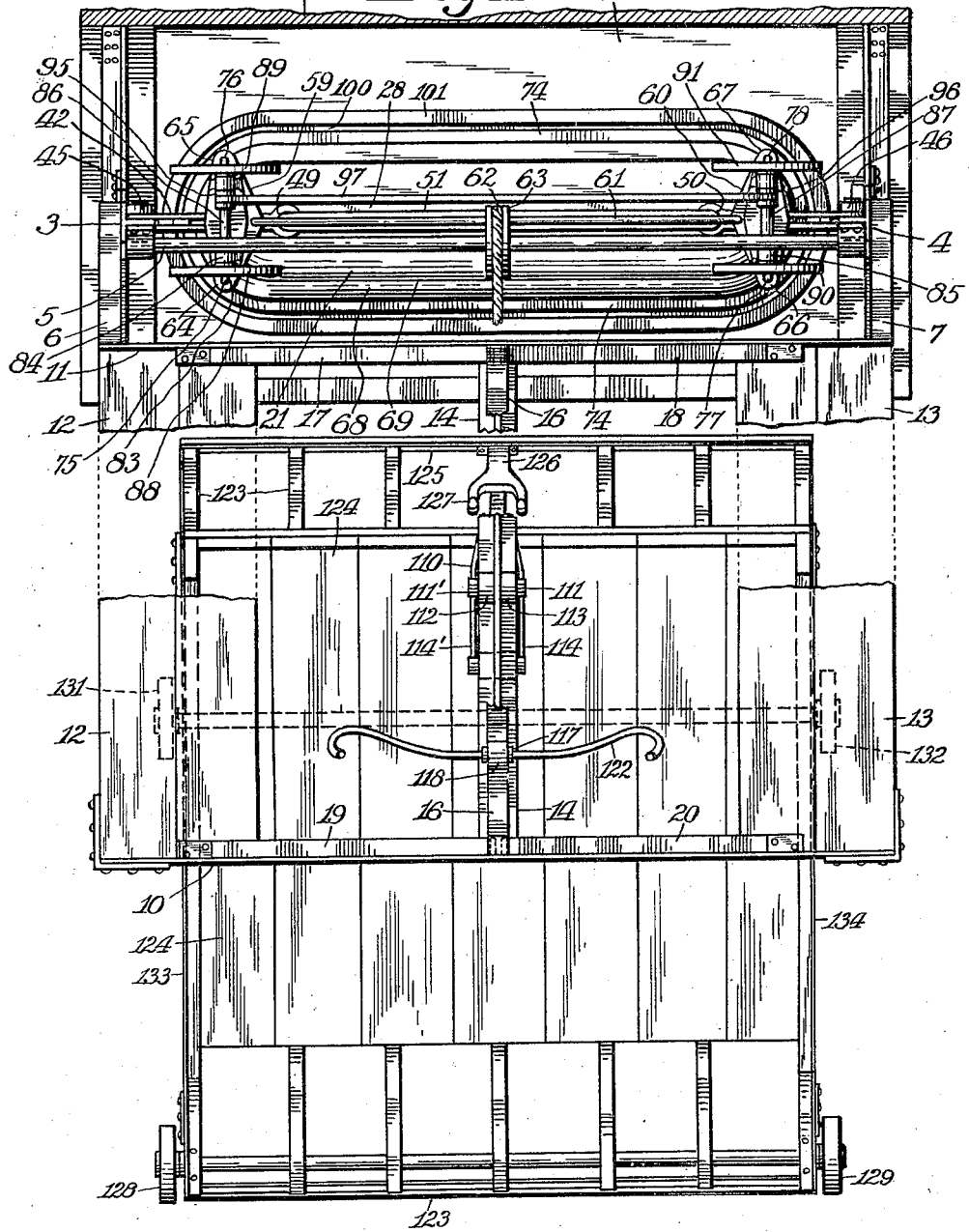

March 4, 1924. 1,485,928

G. W. HOLSINGER

METHOD OF AND MEANS FOR MAKING SHEET GLASS

Filed March 8, 1920  7 Sheets-Sheet 4

WITNESSES:
Robert Liebrich
F. M. Roeder

Inventor:
George W. Holsinger,
By E. D. Silvius,
Attorney.

March 4, 1924.  1,485,928

G. W. HOLSINGER

METHOD OF AND MEANS FOR MAKING SHEET GLASS

Filed March 8, 1920  7 Sheets-Sheet 5

WITNESSES:
Robert Liebrich
F. M. Roeder

Inventor:
George W. Holsinger,
By E. D. Silvius,
Attorney.

March 4, 1924. 1,485,928
G. W. HOLSINGER
METHOD OF AND MEANS FOR MAKING SHEET GLASS
Filed March 8, 1920 7 Sheets-Sheet 7

WITNESSES:
Ed J. Clark.
F. M. Roeder.

Inventor:
George W. Holsinger,
By E. T. Silvius.
Attorney.

Patented Mar. 4, 1924.

1,485,928

UNITED STATES PATENT OFFICE.

GEORGE W. HOLSINGER, OF VINCENNES, INDIANA.

METHOD OF AND MEANS FOR MAKING SHEET GLASS.

Application filed March 8, 1920. Serial No. 363,928.

*To all whom it may concern:*

Be it known that I, GEORGE W. HOLSINGER, a citizen of the United States, residing at Vincennes, in the county of Knox and State of Indiana, have invented a new and useful Method of and Means for Making Sheet Glass, of which the following is a specification, reference being had to the accompanying drawings and to the letters and figures of reference marked thereon.

This invention relates to the production of sheet glass, both flat and curved forms, particularly by drawing the glass upward from a molten mass of glass, the invention having reference especially to the method of and means for making a plurality of sheets of glass from one drawing operation.

An object of the invention is to provide a method of and means for making sheet glass which shall be of superior structure and which shall especially be free from imperfections in the body and the surfaces of the glass, and yet not be costly to produce.

Another object is to provide a method of drawing glass so that it shall be free from faults hitherto caused by particles of scum or foreign substance becoming incorporated in the drawn glass.

A further object is to provide means whereby to prevent particles of scum or foreign substance from being incorporated in the body of glass while being drawn from a reservoir.

A still further object is to provide a method of and means for making sheet glass inexpensively and more perfectly than hitherto, and so that the glass shall be of the most perfect quality and transparency and which also shall be strong and durable so as to be economical in use, which means of production shall be simple and easily operated and without requiring highly skilled operators or attendants.

With the above-mentioned and other objects in view, the invention consists in improved means for drawing glass in tubular form and for advantageously handling the drawn glass through the process of annealing the glass and converting the tubular form into glass sheets; and, the invention consists also in an improved method of drawing and manipulating the drawn glass until finished glass sheets are produced. And, the invention consists also further in the parts and combinations and arrangements of parts as hereinafter particularly described and further defined in the appended claims.

Figure 2:
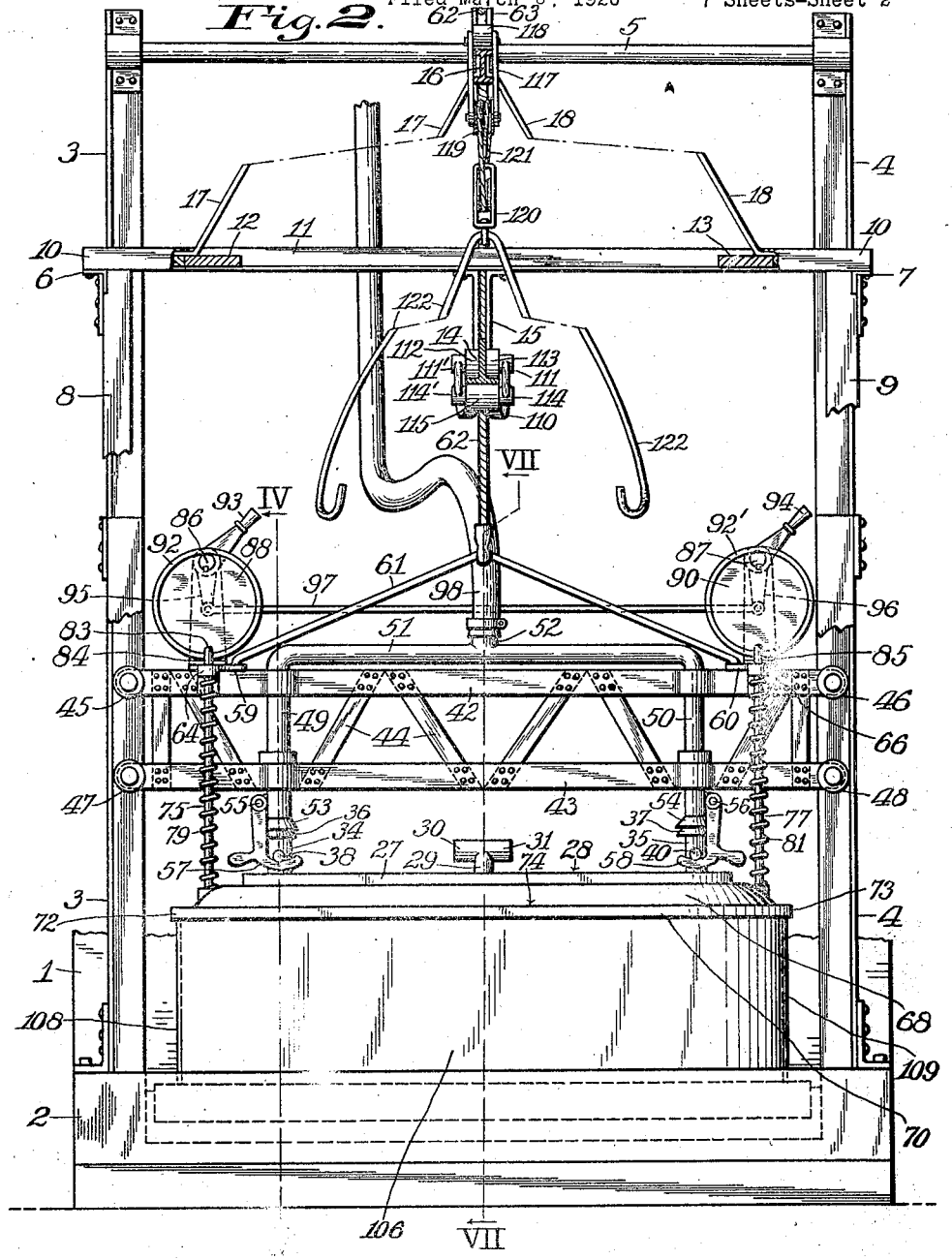
Figure 3:
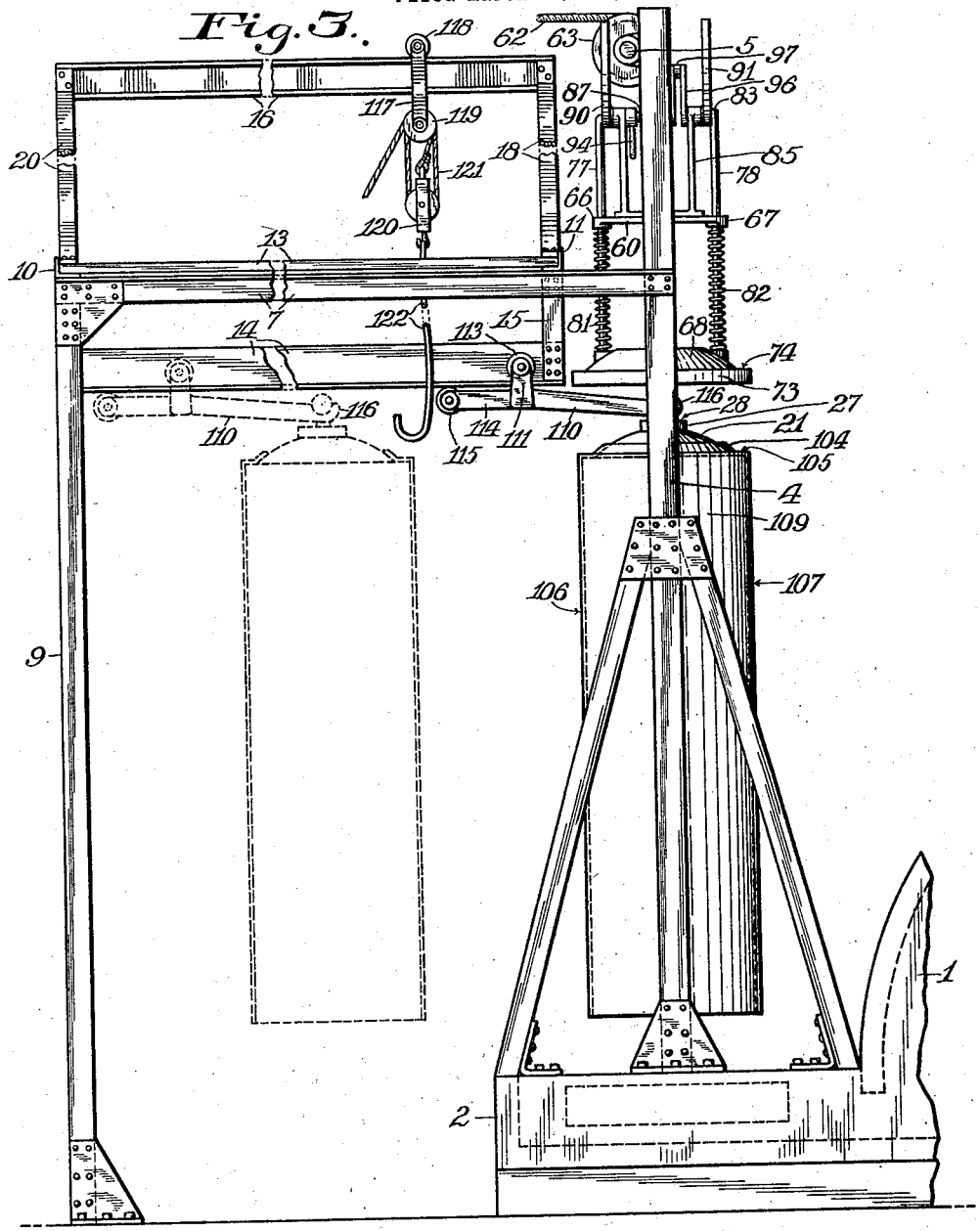
Figure 4:
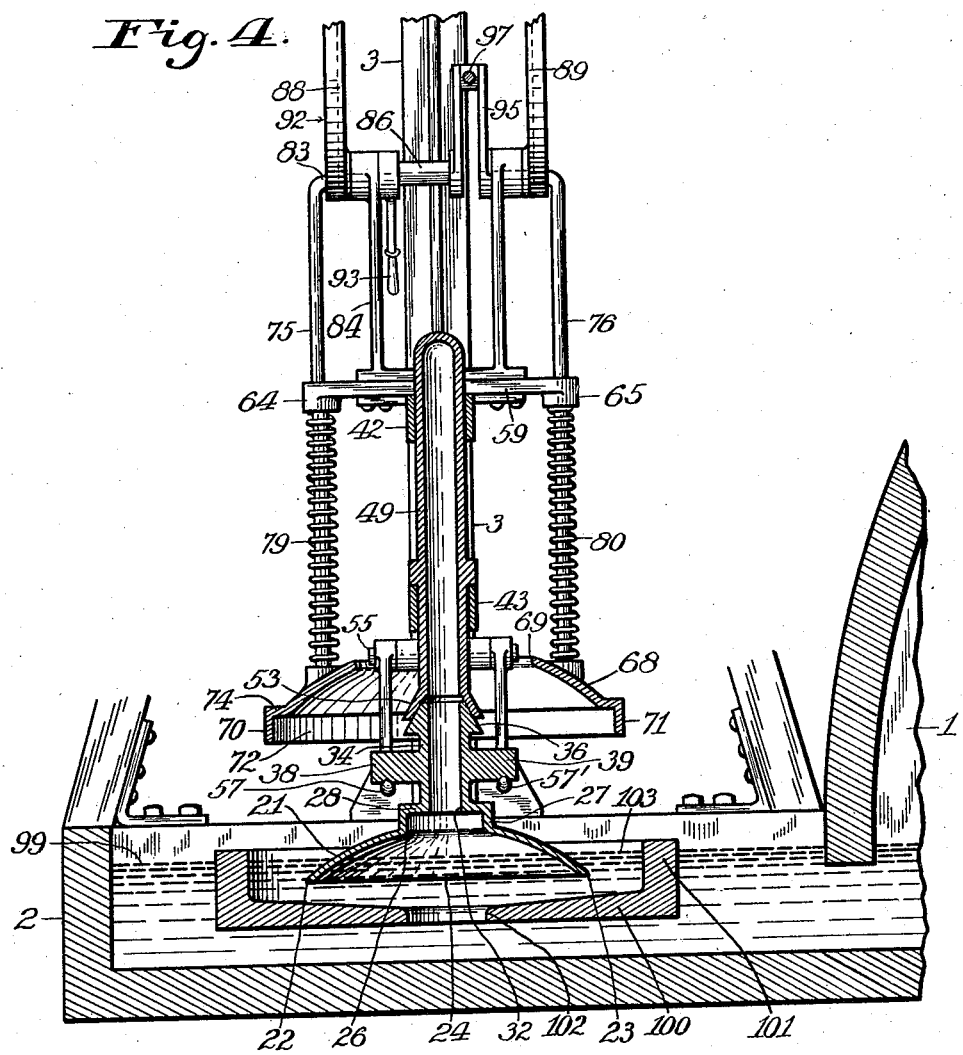
Figure 5:
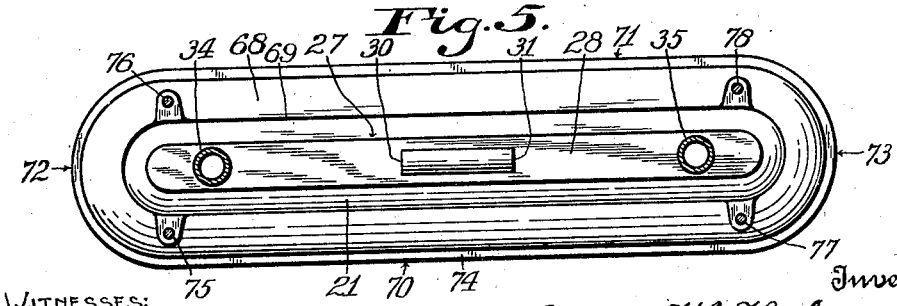
Figure 6:
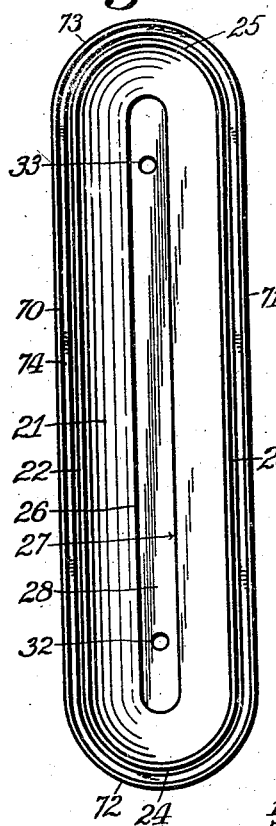
Figure 7:
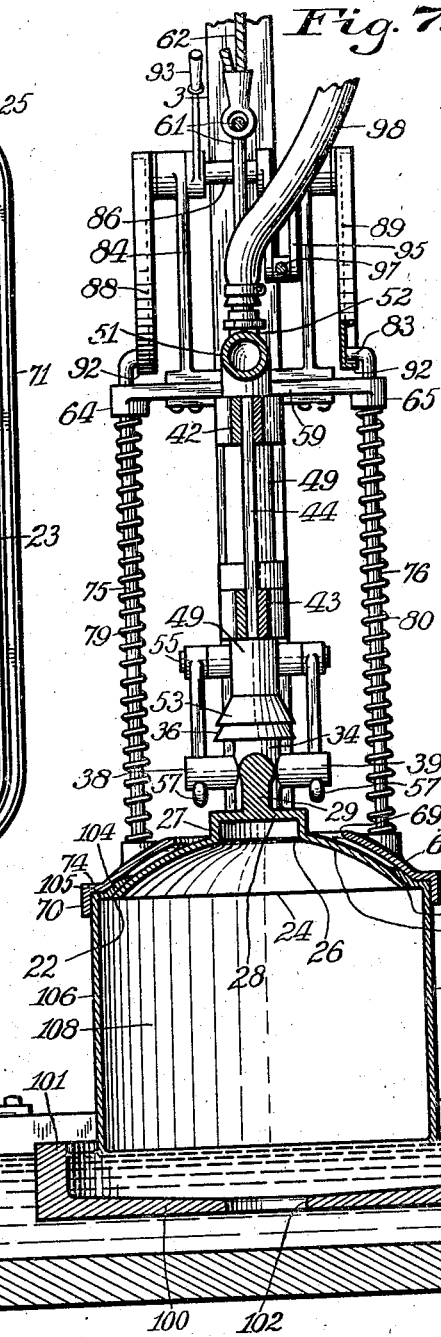
Figure 8:
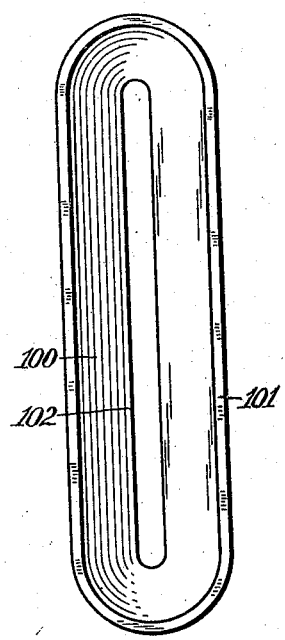
Figure 9:
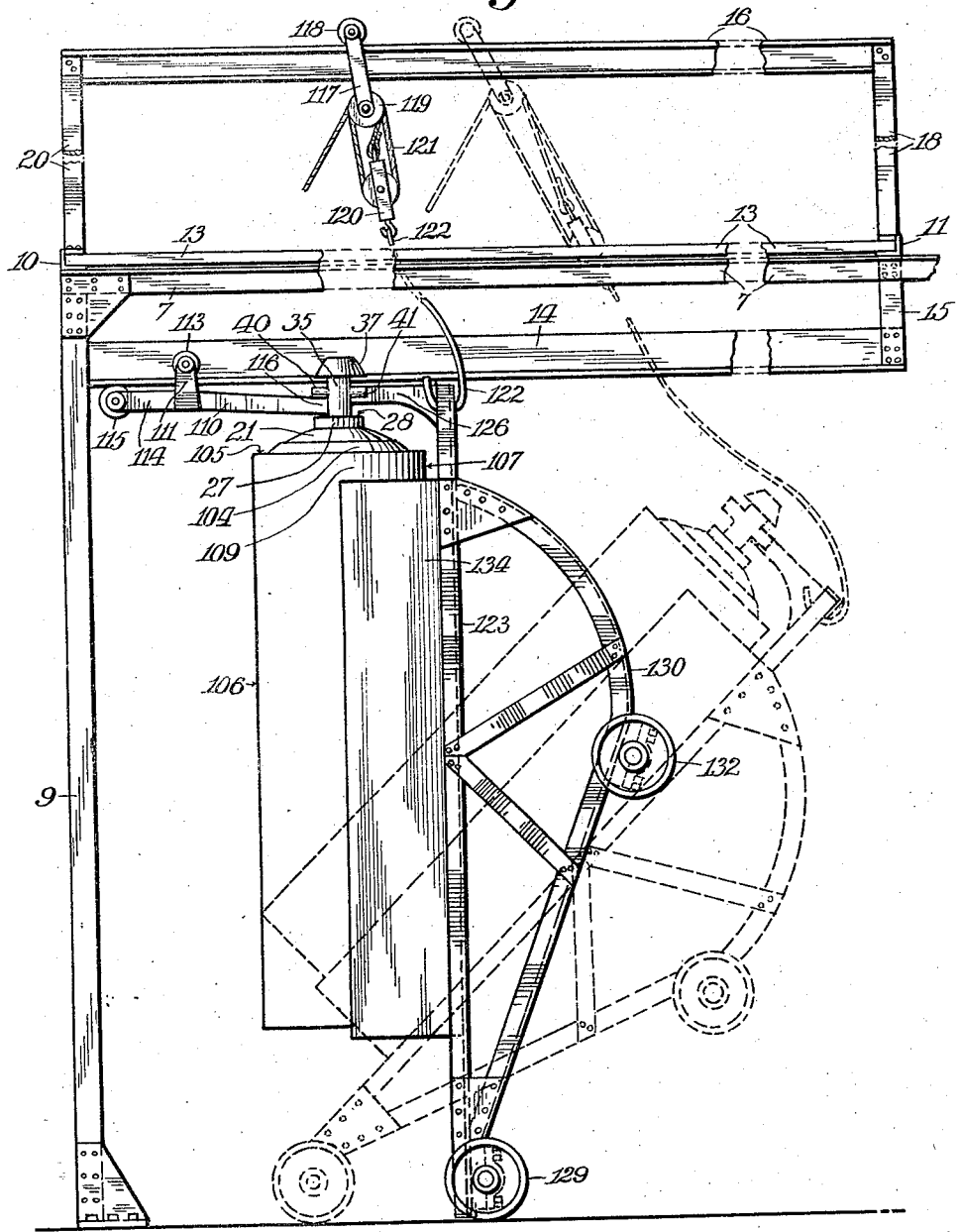
Figure 10:
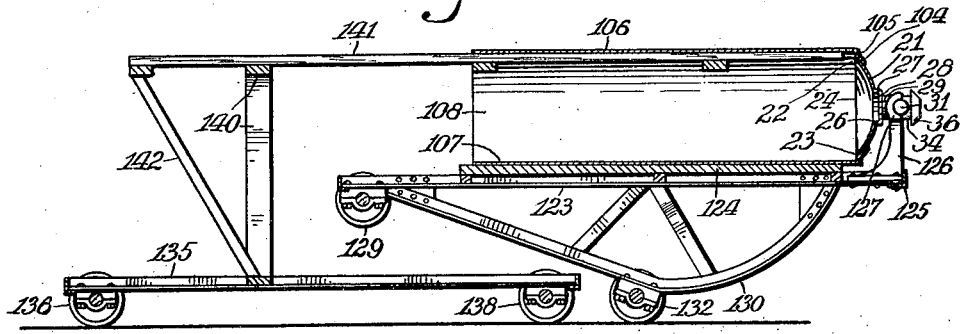
Figure 11:
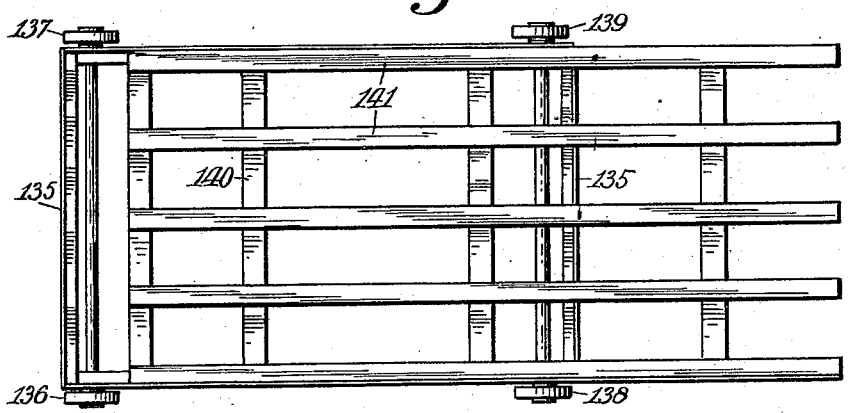
Figure 12:
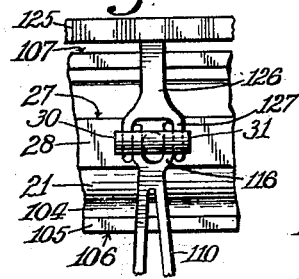
Figure 13:
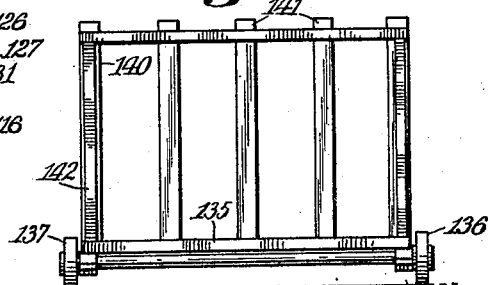

Referring to the drawings,—Figure 1 is a top plan of the principal structure embraced in the invention, parts of which are broken away in the interest of clearness; Fig. 2 is a front elevation partially broken away showing more particularly the principal features of the invention; Fig. 3 is a side elevation partially broken away showing the principal features of the invention; Fig. 4 is a fragmentary section on the line IV—IV in Fig. 2 with parts differently adjusted; Fig. 5 is a top plan of the former and the bait embraced in the invention; Fig. 6 is an inverted plan of the former and the bait; Fig. 7 is a fragmentary section on the line VII—VII in Fig. 2 on an enlarged scale; Fig. 8 is a top plan of a clarifier or skimmer device to prevent dross or impurities from becoming incorporated in the glass when being drawn; Fig. 9 is a side elevation of the apparatus partially broken away, whereby to handle the glass while being tempered and also for handling the glass and arranging it to be cut into sheets; Fig. 10 is a central section of a drawn glass tube arranged in connection with appliances to facilitate the cutting of the glass into sheets; Fig. 11 is a top plan of a movable table shown in the preceding figure to receive the sheet of glass when cut from the glass tube; Fig. 12 is a fragmentary top plan of the glass tube and its carrying bait together with the truck for handling the glass tube; and, Fig. 13 is an end elevation of the movable table.

Similar reference characters in the different figures of the drawings indicate corresponding elements or features of construction herein referred to in detail.

In the drawings the numeral 1 indicates a melting furnace or similar structure in which the molten glass is produced from sand and other suitable substances, as is well known, an open top reservoir or annex 2 extending from the furnace to receive the molten glass which is drawn upward from the reservoir as required. A suitable derrick or frame is erected on or adjacent to the reservoir and comprises two vertical braced guides 3 and 4 spaced apart and supporting a shaft 5 adjacent to their tops. At a suitable distance from the tops of the guides two frame beams 6 and 7 are secured thereto, the beams extending to and being secured to end legs or posts 8 and 9 respectively. A cross-bar 10 is secured to the beams and the legs and another cross-bar 11 is secured to the beams at a suitable distance from the vertical guides, the cross-bars supporting platform sections or running boards 12 and 13. A track rail 14 is horizontally suspended under the middle portions of the cross-bars by means of hangers 15. Another track rail 16 is arranged above the rail 14 and so as to be higher than the platform sections and is supported at one end by means of legs 17 and 18 and at the opposite end by similar legs 19 and 20. The track rails are designed and arranged for the advantageous handling of the product of the apparatus.

A novel bait is provided which comprises a curved body portion 21 of suitable plan contour, the under side of the body portion being concave. When shaped for producing two flat sheets and two curved sheets of glass the bait has two straight side edges 22 and 23 and curved end edges 24 and 25, the body portion having a central opening 26 at the sides of which is an upright wall 27 on which is a central top portion 28, so as to form a clear air space under the bait and a strong central portion conveniently reinforcing the middle portion of the bait. The middle portion of the top 28 has a vertical stem 29 thereon which has laterally extending lugs 30 and 31 thereon, the lugs preferably extending longitudinally of the bait. Adjacent to the ends of the bait the top 28 has air-inlet apertures 32 and 33 thereon and tubes 34 and 35 forming connection with the apertures respectively. The upper ends of the tubes have ball-joint or conical joint portions 36 and 37 respectively; and one tube has transversely extending lugs 38 and 39, the remaining tube having similar lugs 40 and 41 thereon whereby to lift the bait when drawing glass from the reservoir.

A suitable head frame is provided and preferably comprises a top beam 42 and a bottom beam 43, the beams preferably being built up of bar metal and provided with truss-braces 44. The top beam is provided with guide rollers 45 and 46 arranged to operate on the vertical guides 3 and 4 respectively, and the bottom beam has similar rollers 47 and 48 to also operate on said guides respectively. Two vertical pipes 49 and 50 are secured to the head frame so as to be in alinement with the tubes 34 and 35 respectively, and are connected to a distributing pipe 51 having an inlet 52. The lower ends of the pipes 49 and 50 have joint sockets 53 and 54 adapted to be removably connected with the joint members 36 and 37 respectively. The pipes 49 and 50 are provided also with pivots 55 and 56 respectively, one pivot having hook lugs 57, 57', thereon to engage the lugs on the tube 34, the other pivot having hook lugs 58 thereon adapted to be connected with the lugs on the tube 35, to secure the pipes to the tubes and permit air to be conducted therethrough. The distributing pipe 51 may be variously supplied with air or suitable gas under compression. The head frame has two transverse members 59 and 60 which are secured to the top beam thereof and a lifting bail or loop 61 is connected thereto and to a lifting cable 62 which extends over a pulley or sheave 63 mounted on the shaft 5. The cable may be operated by any suitable means desired. The transverse frame member 59 has vertical guides 64 and 65 and the member 60 has similar guides 66 and 67.

An improved former is provided which is adapted to co-operate with the bait, to form and draw the glass, and comprises a curved body portion 68 having a concave under portion conforming approximately to the curved body and particularly the convex top portion of the bait, the body portion of the former having a central aperture 69 to receive the middle portion of the bait. The body portion of the former is slightly broader and longer than the bait and is provided with a downward extending flange having two straight side portions 70 and 71 and curved end portions 72 and 73 that are connected by a ledge or shoulder portion 74 with the body portion 68. To control and guide the former, the body portion thereof has rods 75 and 76 thereon that extend through the guides 64 and 65, and similar rods 77 and 78 that extend through the guides 66 and 67, respectively; and coil springs 79 and 80 are arranged on two of the rods under compression between the guides 64 and 65 respectively and the body portion of the former, and two similar springs 81 and 82 are likewise arranged on the remaining two rods respectively, to press the former downward upon the bait. The upper end of each controlling rod has a lateral lug 83 thereon. Two stands 84 and 85 are secured upon the transverse members 59 and 60 respectively and rotatably support rotary shafts 86 and 87 respectively. Two eccentrics 88 and 89 are secured to one of the rotary shafts and two similar eccentrics 90 and 91 are secured to the remaining one of the shafts, the eccentrics being arranged adjacent to the lugs of the controlling rods, and each eccentric has a lateral flange or rib 92, or 92', thereon that is adapted to engage the adjacent lug to raise or lower the former upon rotation of the rotary shafts which may be rotated by various means; simple devices as hand levers 93 and 94 being shown as secured to the shafts respectively. The shafts may be variously connected so as to be controlled in unison, as shown the shafts having cranks 95 and 96 to which a coupling rod 97 is connected; and it will be understood that the shafts may have other cranks at different angles likewise coupled, or the shafts may be coupled by means of a sprocket chain and wheels if desired. Preferably the distributing pipe 51 is supplied with air or gas through a flexible hose 98 connected with the inlet 52 and with any suitable source of supply desired.

In the reservoir 2 the molten glass forms a flowing mass 99 in which there may be impurities and floating particles of scum-like substance, and it is important that such impurities shall not become incorporated in the glass plates; and in order to insure perfect glass a novel clarifier device is provided which comprises a bottom 100 on which is a continuous wall 101, the bottom having a central aperture 102 therein. The clarifier device preferably is composed of suitable material that will float in the molten glass and permit the glass to flow through the aperture to form a clean or skimmed body 103 of molten glass from which impurities in the main mass are excluded by the wall 101. The clarifier device may be composed of molded clay or of a suitable composition. When the bait is lowered into the clean glass mass the molten glass flows on to the convex top of the edge portions of the bait so as to form the shoulder portion 104 upon which the body portion 68 of the former is forced; after which compressed air or suitable gas is supplied with sufficient force to blow the semi-liquid glass out against the flange of the former which determines the shape of the glass tube, and so as to cause the formation of a shoulder portion 105 against the ledge portion 74, partly for the purpose of preventing leakage of air to the atmosphere. As the bait and the former are slowly elevated together the molten glass is drawn upward and becomes partially cooled and set so as to form two flat sides 106 and 107 and rounded or curved ends 108 and 109, until a tube of the desired length is drawn while air or suitable gas is admitted to the tube under proper pressure to counteract the external atmospheric pressure. The weight of the glass causes the walls of the tube to be vertical and to have true surfaces. After the tube is cut off from the mass 103 it is drawn upward a suitable distance and subsequently disconnected from the bait and former, as will be further explained.

An arm 110 is provided which has hangers 111 and 111' on which rollers 112 and 113 are mounted and arranged to roll on the track rail 14 to constitute a carrier having extension members 114 and 114' to which a roller 115 is connected so as to have contact with the under side of the rail. The end of the arm 110 has a fork 116 to be brought into engagement with the under side of the lugs 30 and 31 when the former has been lifted away from the bait and the top of the glass tube.

In order to be enabled to complete the required operations a hanger 117 is provided which has a roller 118 arranged to operate upon the track rail 16, and the hanger is provided with tackle comprising a sheave 119, a pulley block 120 and a cable 121, and a grapple 122 is connected to the pulley block and preferably has two hook arms adapted to control a truck comprising a flat platform frame 123 having a floor 124 thereon. The upper portion of the truck frame has a strong cross-bar 125 provided with an arm 126 which has a fork 127 designed to straddle the fork 118 and support the lugs 30 and 31 while the fork 118 is withdrawn. The lower portion of the truck frame is provided with wheels 128 and 129. To permit the truck floor to be arranged at different angles or to be tilted, the track frame has a leg frame 130 provided with wheels 131 and 132, on which the truck may be tilted or may be supported at an inclination on all the wheels. Preferably the truck platform has side boards 133 and 134. The cross-bar 125 may be engaged by the grapple to lift or to lower the truck with its load.

For the purpose of enabling the operator to quickly and safely cut a sheet of glass from the glass tube, a table is provided whereby to support the sheet or plate. The table may be variously constructed as to details and preferably is movable for convenience. A preferred construction comprises a main frame 135 having wheels 136 and 137 at one end and similar wheels 138 and 139 at its opposite end. The main frame firmly supports a suitable stand 140 relatively closer to one than the opposite end of the frame, the stand firmly supporting at one end a suitable table 141 which extends beyond the main frame and preferably has suitable braces 142.

In practical use the eccentrics on the head frame are turned so as to cause the former to be drawn upward from the bait which is connected with the head frame as hereinbefore explained, after which the bait is lowered into the clean mass of molten glass in the clarifier device. The head frame is drawn upward by the operating cable 62 and after the bait is drawn upward a suitable distance the eccentrics are turned so as to lower the former onto the glass which is drawn upward by the bait. As the drawing proceeds the clarifier device helps shape and control temperature of glass, while the air or gas of suitable temperature is admitted into the tube being drawn. When the tube has been fully drawn and cut off from the remnant adhering to the molten glass the eccentrics on the head frame are upturned so as to elevate the former, after which the carrier arm 110 is moved under the former and brought into engagement with the lugs 30 and 31 to support the bait and the tube, after which the air-tubes on the bait are disconnected from the air pipes and the head frame is further elevated to permit the carrier to carry the bait and the tube thereon over towards the farther end of the rail 14 and permit operation of the truck as illustrated in Fig. 9, the truck being raised by means of the tackle so as to bring the fork 127 under the lugs 30 and 31 and to lift the lugs from the fork 116, thus transferring the bait and the tube to the truck which may then be lowered on the rear wheels of the truck by means of the tackle, somewhat as shown by broken lines in Fig. 9. When the truck is lowered until the forward wheels are on the ground the truck may be tilted and rolled to a suitable place where the table 141 is entered into the tube as shown in Fig. 10, after which the uppermost flat side of the tube may be cut from the end portion and the top shoulder portion of the tube and permitted to rest upon the table while being removed. Access may then be had to the lowermost side of the tube and it may be cut off from the curved end portions and the top shoulder portion of the tube and rest upon the truck while the end portions may be cut off from the shoulder portion and removed to be used as curved or bent sheets. It will be understood that the former and the bait may have any desired dimensions to produce bent sheets of different degrees of curvature and that in some cases the curved sheets may be reheated and bent more or less as may be required. Because of the shapes of the bait and the former as described above, the glass shoulder portion of the tube may shrink without causing the glass tube to crack and is easily separated therefrom.

During the time required for handling the tube the glass gradually becomes cool and annealed or tempered. Since nothing but the internal and external air comes in contact with the tube while being drawn and while the glass surface is becoming set, the surface when hard is free from blemishes and imperfections, and with proper precautions a wavy surface is prevented, the result of the operations according to the approved method being that glass sheets of high quality are inexpensively produced and without special finishing treatment.

Having thus described the invention, what is claimed as new is—

1. Glass-making apparatus including a bait to draw molten glass, and a former having a clamp portion to press the glass upon the bait and permit the glass to be expanded out beyond the bait, the clamp portion of the former having a flange to surround and extend down beyond the bait and limit the expansion of the glass and determine the cross-section form thereof.

2. Glass-making apparatus including a bait to draw molten glass, a former having a clamp portion to press the glass upon the bait and permit the glass to be expanded out beyond the edge of the bait, the clamp portion having a flange to surround and extend down below the edge of the bait and limit the expansion of the glass to determine the cross-section form thereof, and a ring float having a plan form corresponding to the contour of the flange to co-operate therewith in determining the cross-section contour of the drawn glass.

3. Glass-making apparatus including a bait comprising a curved body portion, the under side thereof being concave, the body portion having an upwardly offset central portion; two air-tubes fixed on the top of the offset central portion and provided with lugs to lift the bait, air-pipes to be connected to the air-tubes respectively; and a former comprising a curved body portion having a concave under side and having also a central aperture to receive the offset central portion of the bait, the body portion of the former having a flange thereon extending downward to surround the bait at a distance from the edge thereof.

4. Glass-making apparatus including a vertically movable head frame, two air-pipes secured to the head frame in spaced apart vertical arrangement, a former having controlling rods connected to the top thereof, the rods being guided on the frame for vertical movement, coiled springs arranged on the rods respectively and under compression between the former and the head frame, means on the head frame to support and adjust the controlling rods, a bait having air-tubes thereon spaced apart to be connected to the air-pipes respectively, and means for removably securing the air-tubes in connection with the air-pipes.

5. Glass-making apparatus including a head frame guided for vertical movement, a former arranged below the head frame and provided with a plurality of controlling rods, synchronously-operated devices mounted on the head frame and having supporting and controlling connections with the controlling rods, a bait to co-operate with the former and provided with lifting devices spaced apart on the top thereof, carrying devices secured to the head frame and extending downward therefrom to be connected to the lifting devices, means to lock the lifting devices detachably to the carrying devices, and a lug device centrally fixed upon the top of the bait to support the bait when the lifting devices are disconnected from the carrying devices.

6. Glass-making apparatus including a pair of vertical guides, a head frame movably guided by the vertical guides and provided with a plurality of synchronously-operated adjusting devices to co-operate with the frame, a bait detachably connected to the head frame to be carried thereby and provided with a device centrally on its top to carry the bait independently of the frame, and a former to co-operate with the bait and having a downward-extending flange on its edge into the confines of which the bait may be received, the former being provided with controlling rods having guiding connection with the head frame and also operative connection with the adjusting devices enabling the devices to carry the former adjustably relatively to the bait.

7. Glass-making apparatus including a pair of vertical guides, a head frame movably guided by the vertical guides and having eccentrics movably mounted thereon; a bait connected with the head frame to be carried thereby, a former to co-operate with the bait and having controlling rods thereon and guided on the head frame, the rods having lugs to contact with the eccentrics respectively to enable the eccentrics to raise or lower the former relatively to the bait, means for operating the eccentrics, and springs on the controlling rods respectively and seated under compression on the former and on portions of the head frame.

8. In means for making sheet glass, the combination of a vertically movable head frame having two air-pipes secured thereon, each air-pipe having a hook pivoted thereon, a bait having air-tubes thereon to be connected with the air-pipes and provided with lugs to be engaged by the hooks respectively, a former to co-operate with the bait, and means adjustably connecting the former with the head frame.

9. In means for making sheet glass, the combination of a vertically movable head frame having guides thereon, stands mounted upon the head frame, shafts rotatably mounted on the stands, eccentrics secured to the shafts and having each a lateral rib thereon, an operating device having connection with one of the shafts, coupling devices connecting the shafts for simultaneous operation thereof, a former having controlling rods guided by the guides on the head frame respectively, the rods having lugs engaging the ribs of the eccentrics respectively, and a bait to co-operate with the former in connection with the head frame.

10. In means for making sheet glass, the combination of a bait having a convexly-curved upper side and also two straight side edge portions and two curved end edge portions, the middle portion of the bait having a central opening therein and a wall extending about the opening, the wall having a top thereon provided with two apertures spaced apart and two tubes extending from the apertures, each tube having two lateral lugs thereon, a vertically guided head frame above the bait, two air-pipes secured to the head frame and adapted to be connected with the tubes respectively, each air-pipe having pivoted hooks to engage the lugs on the adjacent tube, and a former adjustably mounted on the head frame and adapted to co-operate with the bait.

11. The method of making sheet glass consisting in drawing a flattened tube from a mass of molten glass through a hollow device having two straight opposite sides and floating in the mass of glass, in carrying the tube through the atmosphere, in transferring the tube flatwise to a holder to support the lower portion of the tube, in placing a flat supporting table horizontally in the tube, in cutting off the uppermost flat side of the tube, in removing the cut-off portion upon the table, and in cutting off the lowermost flat portion of the tube from the remaining portions thereof on the holder.

In testimony whereof, I affix my signature in presence of two witnesses.

GEORGE W. HOLSINGER.

Witnesses:
 FRANK BASTIAN,
 J. S. WINCHELL.